United States Patent [19]

MacPhail

[11] Patent Number: 5,142,678
[45] Date of Patent: Aug. 25, 1992

[54] METHOD FOR A REQUESTING USER TO USE A MARKER TO ASSOCIATE A DOCUMENT WITH AN END USER ACTION

[75] Inventor: Margaret G. MacPhail, Austin, Tex.

[73] Assignee: International Business Machines Corporation, Armonk, N.Y.

[21] Appl. No.: 289,991

[22] Filed: Dec. 21, 1988

[51] Int. Cl.⁵ ............................................. G06F 15/16
[52] U.S. Cl. ...................... 395/650; 364/225.6; 364/242.94; 364/281.3; 364/253.3; 364/DIG. 1
[58] Field of Search ... 364/200 MS File, 900 MS File, 364/419; 395/650

[56] References Cited

U.S. PATENT DOCUMENTS

| | | | |
|---|---|---|---|
| 4,032,899 | 6/1977 | Jenny | 364/200 |
| 4,358,824 | 11/1982 | Glickman | 364/200 |
| 4,387,424 | 6/1983 | Frediani | 364/200 |
| 4,403,301 | 9/1983 | Fessel | 364/900 |
| 4,404,649 | 9/1983 | Nunley | 364/900 |
| 4,441,163 | 4/1984 | Leikam et al. | 364/900 |
| 4,477,881 | 10/1984 | Kobayashi | 364/900 |
| 4,480,308 | 10/1984 | Grafe et al. | 364/200 |
| 4,503,499 | 3/1985 | Mason et al. | 364/200 |
| 4,503,499 | 3/1985 | Mason | 364/200 |
| 4,530,051 | 7/1985 | Johnson | 364/200 |
| 4,553,860 | 11/1985 | Imaizumi | 364/900 |
| 4,587,633 | 6/1986 | Wang | 364/900 |
| 4,589,068 | 5/1986 | Heinen | 364/200 |
| 4,633,430 | 12/1986 | Cooper | 364/900 |
| 4,674,040 | 6/1987 | Barker | 364/300 |
| 4,716,543 | 12/1987 | Ogawa | 364/900 |
| 4,731,750 | 3/1988 | Hoflich | 364/900 |
| 4,754,428 | 6/1988 | Schultz et al. | 364/900 |
| 4,794,519 | 12/1988 | Koizumi | 364/200 |
| 4,858,171 | 8/1989 | Furusawa | 364/900 |

Primary Examiner—Thomas C. Lee
Assistant Examiner—Eric Coleman
Attorney, Agent, or Firm—H. St. Julian; Casimer K. Salys

[57] ABSTRACT

Method for marking a document with action markers and specifying an action to be performed by a responding end user. One or more related documents may be specified which are associated with the action to be performed. Notification criteria, notify ID and a status, which are associated with the action to be performed, are also specified. Upon the completion of the action specified, the responding end user updates the status and a message is automatically generated and transmitted to a end associated with the notify ID if the updated status meets the notification criteria. Moreover, the responding end user may, as a part of the review of the document, specify a related document which is associated with the review of the document as marked with the action markers.

8 Claims, 5 Drawing Sheets

---

ACTION MARKER

ACTION: FYI                       STATUS: OPEN

DUE DATE: 6/12/88                 NOTIFY: YES

PERSON RESPONSIBLE:               FOR STATUS: COMPLETED

RELATED DOCUMENT:                 NOTIFY ID: MARY

---

SET ACTION AS APPROPRIATE FROM LIST OR GENERATE A NEW ONE
SET RESPONSIBLE PERSON TO AN INDIVIDUAL OR A REFERENCE
SET DUE DATE AS APPROPRIATE
SET NOTIFICATION AS APPROPRIATE
SET NOTIFICATION STATUS FROM LIST OR GENERATE A NEW ONE
SET NOTIFY ID TO ID OF PERSON TO BE NOTIFIED
SET RELATED DOCUMENT NAME AS APPROPRIATE

FUNCTIONS

| | | ACTION MARKER | | | |
|---|---|---|---|---|---|
| | | | | | |

FIG. 3

ACTION MARKER

ACTION: FYI                      STATUS: OPEN

DUE DATE: 6/12/88                NOTIFY: YES

PERSON RESPONSIBLE:              FOR STATUS: COMPLETED

RELATED DOCUMENT:                NOTIFY ID: MARY

SET ACTION AS APPROPRIATE FROM LIST OR GENERATE A NEW ONE
SET RESPONSIBLE PERSON TO AN INDIVIDUAL OR A REFERENCE
SET DUE DATE AS APPROPRIATE
SET NOTIFICATION AS APPROPRIATE
SET NOTIFICATION STATUS FROM LIST OR GENERATE A NEW ONE
SET NOTIFY ID TO ID OF PERSON TO BE NOTIFIED
SET RELATED DOCUMENT NAME AS APPROPRIATE

FIG. 4a

FUNCTIONS

| VIEW ACTIONS | VIEW LIST | BEGIN MARKER | END MARKER | END | |
|---|---|---|---|---|---|
| | | | | | |

FIG. 4b

FUNCTIONS

| | | | | | SHOW ACTION |
|---|---|---|---|---|---|
| | | ACTION MARKER | | | |

FIG. 5

ACTION MARKER

| | |
|---|---|
| ACTION: FYI | STATUS: OPEN |
| DUE DATE: 6/12/88 | NOTIFY: YES |
| PERSON RESPONSIBLE: FRED | FOR STATUS: COMPLETED |
| RELATED DOCUMENT: FARM REPORT | NOTIFY ID: MARY |
| COMPLETION DATE: | |

FIG. 6a

FUNCTIONS

| | | | | END | UPDATE MARKER |
|---|---|---|---|---|---|
| | | | | | |

FIG. 6b

METHOD FOR A REQUESTING USER TO USE A MARKER TO ASSOCIATE A DOCUMENT WITH AN END USER ACTION

CROSS-REFERENCE TO RELATED APPLICATIONS

This application is related in subject matter to the following applications filed concurrently herewith and assigned to a common assignee:

Application Ser. No. 07/289,992 filed by M. G. MacPhail entitled "Method of Associating Status With An Action Marker" now U.S. Pat. No. 5,063,495.

Application Ser. No. 07/290,014 filed by M. G. MacPhail entitled "Method of Marking a Document for Action".

TECHNICAL FIELD

This invention relates to a method of associating a document with an action marker and more particularly, to a method of specifying at least one document to be associated with an action marker, to be used by a responding end user in reviewing the document.

BACKGROUND INFORMATION

The use of personal computers has increased both in the home and in business. In recent times, the growth of personal computers in business has been explosive. A great majority of workers now utilize terminals to perform their respective jobs. Moreover, the exchange of information between employees within office or within offices remotely connected has become commonplace through the use of networks. Faster, larger and more reliable networking and distribution systems are being developed. The use of networks have reduced the cost associated with expensive I/O devices such as large DASD devices by making these devices available to all of the users throughout a network. Although networks have coupled users together, new applications are still needed which focus on making tasks performed by a group of users more productive.

SUMMARY OF THE INVENTION

This invention relates to a method of marking a document with action markers and specifying an action to be performed by a responding end user (EU). A requesting EU marks a section of a document to be reviewed by the responding EU. The action to be performed by the responding EU, an identification associated with the responding EU, a due date and a related document, which are specified by the requesting EU, become a part of the document and are associated with a begin action marker and an end action marker. The requesting EU may also specify notification criteria, notify ID and a status to be associated with the action to be performed. Multiple sections can be marked for review by the same responding EU or other responding EUs. After the document has been marked, the document is filed and the responding EU or EUs may be given access to the document to complete the review thereof. Alternately, after the filing of the document, the document can be transmitted to the responding EU or EUs for review thereby. Upon completion of the review of the document, the responding EU or EUs updates the status associated with the action and a message is automatically generated and transmitted to a end user associated with the notify ID if the updated status meets the notification criteria. Moreover, the responding EU or EUs may also specify related documents which are associated with their respective review of the marked document.

BRIEF DESCRIPTION OF THE DRAWING

FIGS. 3, 4a, 4b, 5, 6a, and 6b data areas and functions which may be associated with a selected action marker in accordance with the principles of the present invention.

DESCRIPTION OF THE PREFERRED EMBODIMENTS

Figure 1:
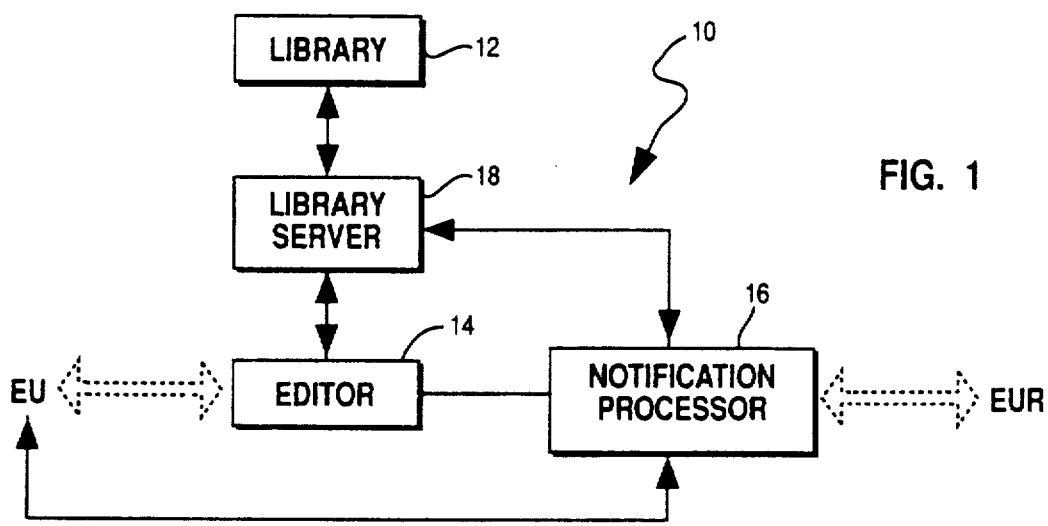
FIG. 1 is a block diagram of a document management system in accordance with the principles of the present invention.

FIG. 1 shows a document management system 10 which controls the creation, retrieval, editing and distribution of documents within an information processing system (not shown). Documents which are created by an end user (EU) are stored in a library 12. The library 12 performs various services for the system 10. These services are used for storing and retrieving documents electronically. Whenever a document is filed in the library 12, a set of descriptors called a document profile is filed with it. The document profile contains descriptors such as a name under which the document is filed, author/owner of the document, the subject of the document and the date the document was filed in the library. Document profiles facilitates the searching for documents in filed in the library 12.

The library 12 also provides the following services: deleting documents from the library; updating work in progress documents in the library; specifying a security level to be associated with the document which is being filed; allowing authorized end users other than the author/owner to retrieve a document from the library; and performing searches for and retrieving documents filed in the library for other end users.

The EU may retrieve documents, which were previously stored in the library 12, for editing and/or distribution by interacting with a text editor 14. The text editor 14 in the preferred embodiment of the present invention supports a uniform data stream for documents created, stored and edited thereby. The uniform datastream, which is supported by text editor 14 and which is well known in the art, is document content architecture. Text editors supporting document content architecture either support a final form text format or revisable form text format. The text editor 14, in the preferred embodiment, supports the revisable form text format. Since the details of text editors, which support the revisable form text format are well known in the art, they will not explained further herein.

After retrieving a document from the library 12 or creating a new document, the EU may mark at least one selected portion thereof and specify an action to be subsequently performed by another end user. The EU accomplished this by invoking an action marker function which available through the editor 14. Additionally, the EU may invoke a function to notify a responding end user (EUR) for performing the specified action.

The notify function either may be performed within the text editor 14 or through the use of a notify processor 16 which is external to the text editor. The EU interacts with the notify processor 16 to select an existing message or to generate a new message to be transmitted to the EUR. Moreover, the EU may (1) specify a notification criteria so that an appropriate user is notified when the specified action is completed and (2) indicate whether a copy of the document, as marked, and any related documents are to be transmitted to the EUR. When the action marker is first generated, an "open" action status is associated with therewith. When the EUR completes the review of the document, as marked, a completion date is entered into the action marker data area associated with the action marker along with a change of status to "completed". If the notification criteria is so specified, the appropriate user will be notified with a message. Additionally, when performance of the specified action results in the generation of another document, the action marker data area is updated to point to the generated document. Alternately, instead of transmitting the document, as marked, and any related documents to the EUR, the EU may chose to give access to the EUR to a copy of the document filed in the library 12. If the document, as marked, and any related documents are to be transmitted to the EUR, the notify processor 16 interacts with library server 18 to retrieve the documents from the library 12. Thereafter, the notify processor 16 transmits the selected or generated message and the retrieved documents to the EUR. It should be understood that the EUR may be within the same system or remotely coupled to the EU by a network (not shown).

Figure 2:
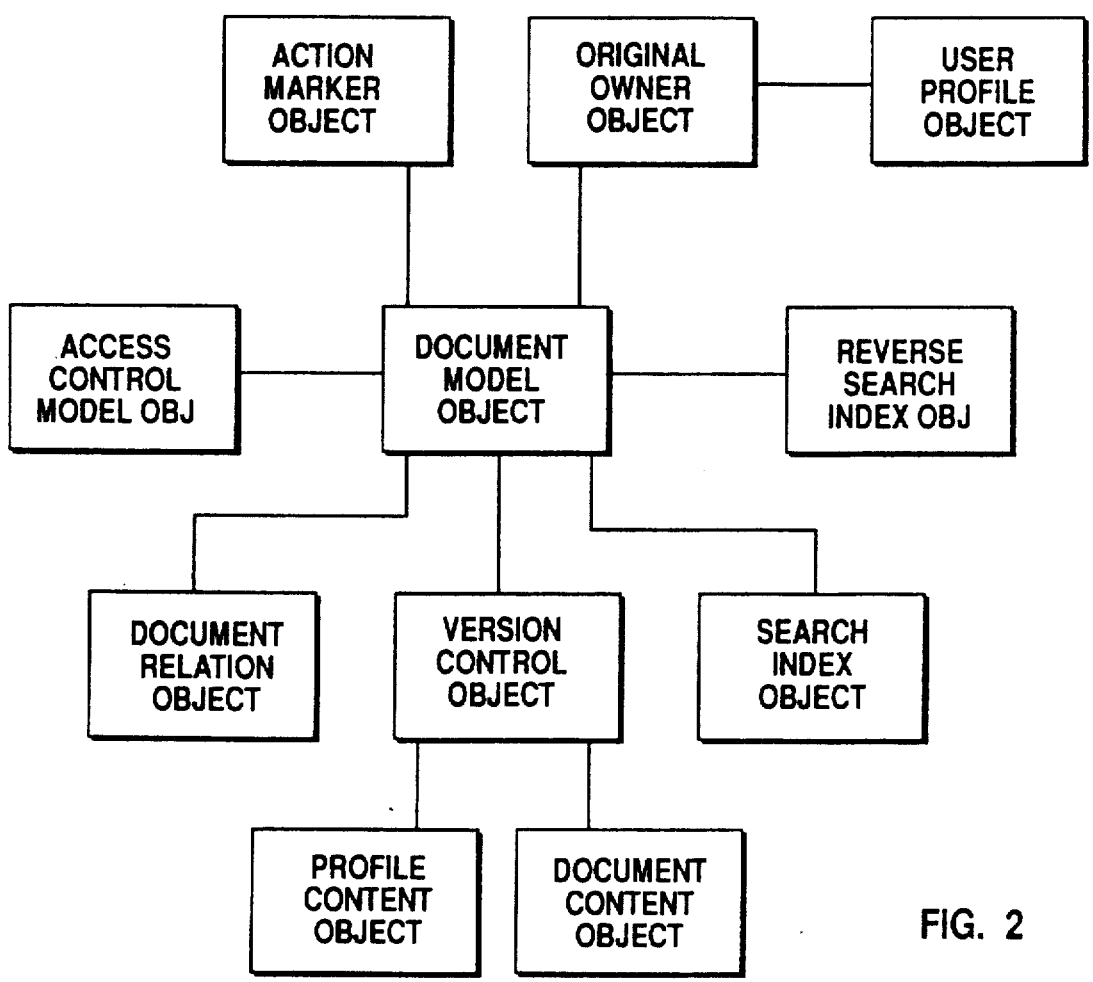
FIG. 2 is a model of a document showing the various objects associated with the document stored in the system of FIG. 1 in accordance with the principles of the present invention.

Referring to FIG. 2, each document filed in the library 12 includes the objects shown therein. All of the objects shown in FIG. 2 are created in response to processing a FILE command.

A document object contains information concerning ownership and attributes of a specific document. This object controls the access to the document during its life in the library 12.

An original owner object contains or points to information used by an owner of the document to control access to the document as filed.

A document content object provides for the storage of the document content and for saving information relating to the actual size of the filed document.

A document relation object describes the logical relationship between the document and other documents. If the document is a folder document, each of the documents contained therein has a pointer or library assigned document name (LADN) entry in this object. If this document is in one or more folder documents, then each folder document has a pointer or LADN entry in this object. Enter and remove history may be maintained for the document as a folder document or as a document in other folders.

An access control model object is created when the document owner authorizes other users to access the document.

An action marker model object provides for constructs for the beginning and the end of portions marked in a document. This object also provides for data area where an end user may specify the responding end user, due date, action to be performed, notification, status request and specification of any related documents.

Structures for most of the above-identifed objects are a part of a DISOSS office system marketed by International Business Machines Corporation and will not be described herein.

Referring again to FIG. 1, the editor 14 includes a plurality of functions associated with action markers. The action marker functions may be displayed to the requesting EU on a display unit (not shown) included in document management system 10. Further, the action marker functions may be displayed as items on an action bar on the display unit or as items on a pop-up menu. The action marker functions may be selected by using a pointing device, a keyboard or a touch sensitive screen included as a part of the document management system 10. Alternately, each of the action marker functions may be associated with a selected one of a plurality of function keys on the keyboard. A selected one of the action marker functions facilitates the invocation of an action marker application program.

The preferred embodiment of the present invention enables a requesting end user (EU) to mark-up a selected document and specify an action to be taken by the responding end user (EUR). The requesting EU, interacting with the editor 14 (FIG. 1), activates an action marker function as shown in FIG. 3 to mark a section of the selected document. The document management system 10 then displays in FIGS. 4a and 4b an action marker data and additional action marker functions, respectively, to the requesting EU. The requesting EU, subsequent to having positioned a cursor associated with the display unit at a beginning of a section to be marked, then selects a begin marker function. Thereafter, the cursor is then moved to an end of the section being marked and a end marker function is selected. The editor 14 displays a begin action marker icon or symbol, such as ">>" at the beginning of the section and a end action marker icon or symbol, such as "<<" at the end of the section. The beginning and end action marker icons may be any of a plurality of fancy icons or symbols which are recognizable by all users of the document management system 10. Alternately, a section of a document may be marked by underlining the section to be reviewed, causing the section to appear in bold type, changing the fonts and/or color or the section and/or highlighting the section including the use of reverse video. Additionally, the requesting EU enters the action to be performed, the responding end user to perform the action, and the date which the action must be completed in the action marker data area shown in FIG. 4a if other than a default due date, notification criterion, a notification ID and any referenced document. The requesting EU then either files the document as marked into the library 12 or transmits the document, as marked, to the EUR. In either case, the EU sends a message to the EUR setting forth some action to be taken on the document. If the EU filed the document in the library 12, the EUR must be given access to the document stored therein.

The requesting EU may desire to review an action associated with a selected action marker in the document. The requesting EU activates a show action function shown in FIG. 5. The document management system 10 then displays an action marker data area shown in FIG. 6a and additional action marker functions shown in FIG. 6b. The requesting EU may either change or update the data displayed in the action marker data area or terminate the review of the selected action marker.

Set out below is an illustration of an mark-up application program invocable by a user of the document management system 10 to mark a document and specify actions to be performed by an identified responsible end user within an information processing system. The program is in program design language which source code and machine code are derivable.

```
BEGIN MARK-UP PROC
    INPUT
        POSITION CURSOR AT BEGINNING OF A
        SELECTED SECTION OF THE DOCUMENT
        TO BE MARKED.
        SPECIFY ACTION MARKER DATA
        WHICH INCLUDES:
            ACTION TO BE PERFORMED;
            ID OF USER RESPONSIBLE TO PERFORM
            ACTION;
            DUE DATE, IF OTHER THAN DEFAULT;
            NOTIFICATION CRITERIA;
            NOTIFICATION ID;
            REFERENCED DOCUMENT(S)
        POSITION CURSOR AT END OF THE SELECTED
        SECTION OF THE DOCUMENT BEING MARKED.
    PROCESS
        ASSIGN A UNIQUE ACTION ID FOR
        THIS ACTION MARKER.
        CREATE A BEGIN ACTION MARKER
        CONSTRUCT FOR THIS ACTION.
        DISPLAY BEGIN ACTION MARKER SYMBOL AT
        POSITION OF CURSOR.
        SET DEFAULT DUE DATE, NOTIFY,
        NOTIFY FOR STATUS AND NOTIFY ID.
        GET ACTION MARKER DATA FROM
        USER INCLUDING:
            THE ACTION, USER RESPONSIBLE,
            DUE DATE, NOTIFICATION CRITERIA,
            NOTIFICATION ID, REFERENCED
            DOCUMENT(S) AND POSITION OF
            THE END ACTION MARKER.
        DO FOR EACH RELATED DOCUMENT
        SPECIFIED
            RESOLVE USER-ASSIGNED NAME TO
            UNIQUE IDENTIFIER
        ENDDO
        CREATE END ACTION MARKER CONSTRUCT
        FOR THIS ACTION.
        DISPLAY END ACTION MARKER SYMBOL
        AT POSITION OF CURSOR.
        CREATE AN ENTRY IN THE ACTION
        MARKER DATA
        AREA ASSOCIATED WITH THIS ACTION
        MARKER.
        DO FOR EACH RELATED DOCUMENT
        NAME RESOLVED
            SET UNIQUE DOCUMENT IDENTIFIER
            IN THE ACTION MARKER DATA AREA
        ENDDO
        SET THE ACTION ID, ACTION, USER
        RESPONSIBLE, DUE DATE, BEGIN
        MARKER LOCATION, AND END
        MARKER LOCATION IN THE
        ACTION MARKER DATA AREA.
END MARK-UP PROC
```

Figure 7:
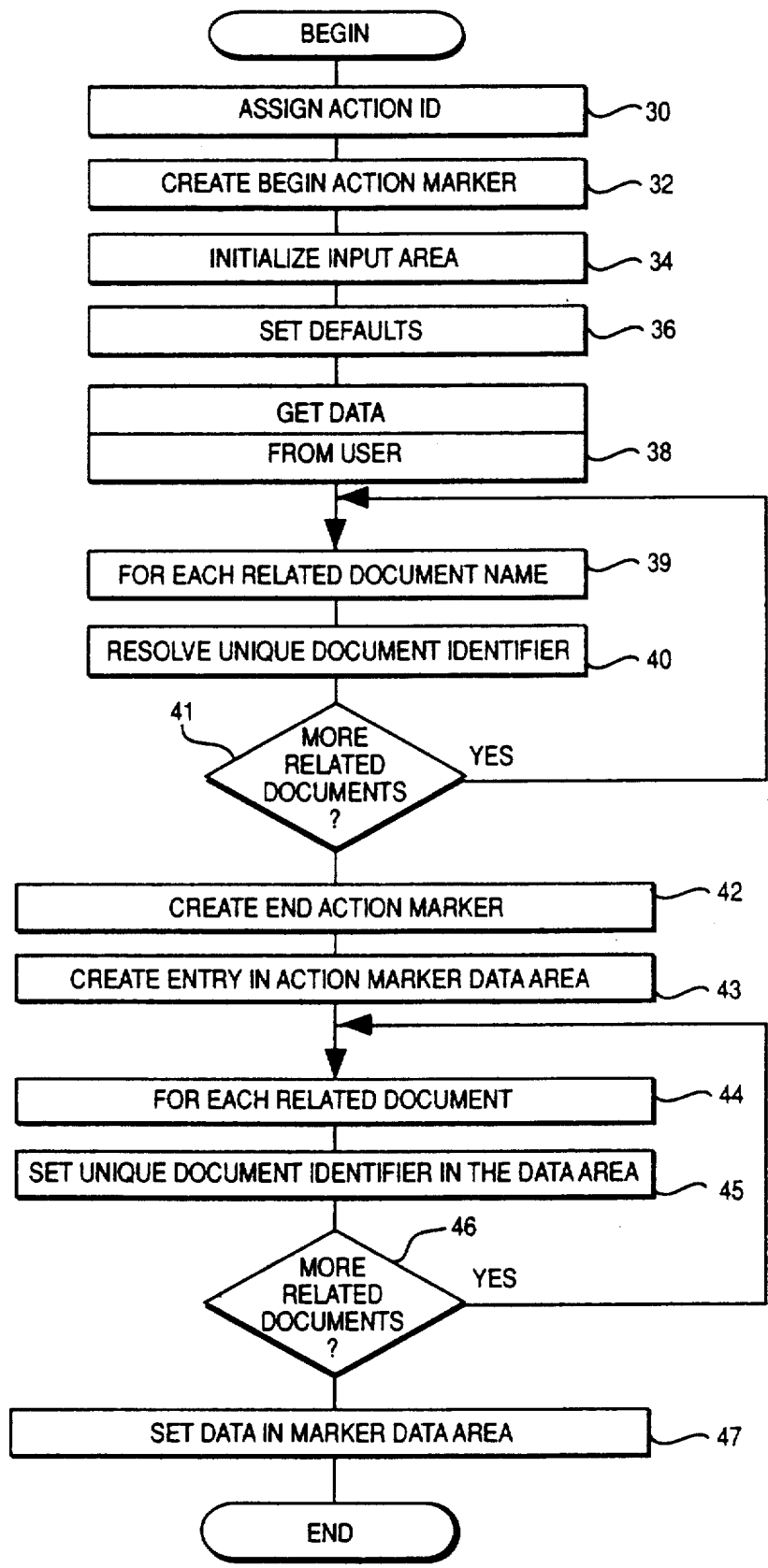
FIGS. 7 and 8 are flow diagrams illustrating detailed steps of the method of the present invention.

Referring to FIG. 7, there is shown a flow diagram for marking a document. Subsequent to the invocation of the mark-up application program, each action to be performed in association with the selected document has an unique action identifier assigned thereto in step 30. This identifier is also used to couple the begin action marker to the end action marker. In step 32, a begin action marker construct is generated in the data associated with the selected document and corresponds to the present position of the cursor within the document. In step 34, the action marker display data area, to be associated with the action marker, is initialized. The action marker display data area may be a pop-up window, a menu or any other input mechanism. The document management system 10 then sets the defaults for the due data, whether notify is requested (yes or no), notification status (completed) and an notification ID (requester EU) in the action marker data area in step 36. The requesting EU may, if desired, override any or all of the defaults set forth above. In step 38, the document management system 10 then displays the action marker data area and any additional action marker functions to the requesting EU for the entry of data in the data area and the activation of the additional action marker functions. Lists for person responsible (responding EU), status, and notify ID can be provided to the requesting EU to facilitate the entry of the data into the data area. The entered data is then made available to the application program. In steps 39 through 41, a name associated with each related document is resolved to by the system 10 to be an unique identifier. In step 42, an end marker construct is generated in the selected document in response to the activation of the end action marker function. The end marker construct is built in the data associated with the document and corresponds to the current position of the cursor. Moreover, the end marker construct will include the unique identifier associated with the begin action marker. An entry is created into the action marker data area in the document model object in step 43. In steps 44 through 46, the resolved unique identifier associated with each of the specified related documents are entered into the action marker data area. The data, which was entered by the requesting EU in steps 38, is then entered into the action marker data area in step 47.

Set out below is an illustration of an update action application program invocable by a user of the document management system 10 to update the action marker data area associated with an action marker of the document. The program is in program design language which source code and machine code are derivable.

```
BEGIN UPDATE ACTION PROC
    INPUT
        MOVE CURSOR TO A SELECTED BEGIN
        OR END ACTION MARKER WITHIN
        DOCUMENT.
    PROCESS
        GET AND SAVE THE ENTRY ASSOCIATED
        WITH THIS ACTION MARKER.
        SET THE ACTION, PERSON RESPONSIBLE,
        DUE DATE, COMPLETION DATA,
        NOTIFICATION CRITERIA, NOTIFICATION
        ID AND CURRENT STATUS FOR DISPLAY TO
        REQUESTER.
        DISPLAY DATA TO REQUESTER.
        DO FOR EACH RELATED DOCUMENT
        SPECIFIED
            RESOLVE USER-ASSIGNED NAME TO
            UNIQUE IDENTIFIER
            SET UNIQUE IDENTIFIER IN THE
            ACTION MAKER DATA AREA
        ENDDO
        UPDATE THE ENTRY AS SPECIFIED.
        IF THE STATUS IS CHANGED AND
        THE NEW STATUS
            EQUALS THE NOTIFICATION STATUS AND
            REQUESTER WANTS NOTIFICATION, THEN
                SEND A NOTIFICATION MESSAGE
                TO THE ID TO BE NOTIFIED.
        ENDIF
END UPDATE ACTION PROC
```

Figure 8:
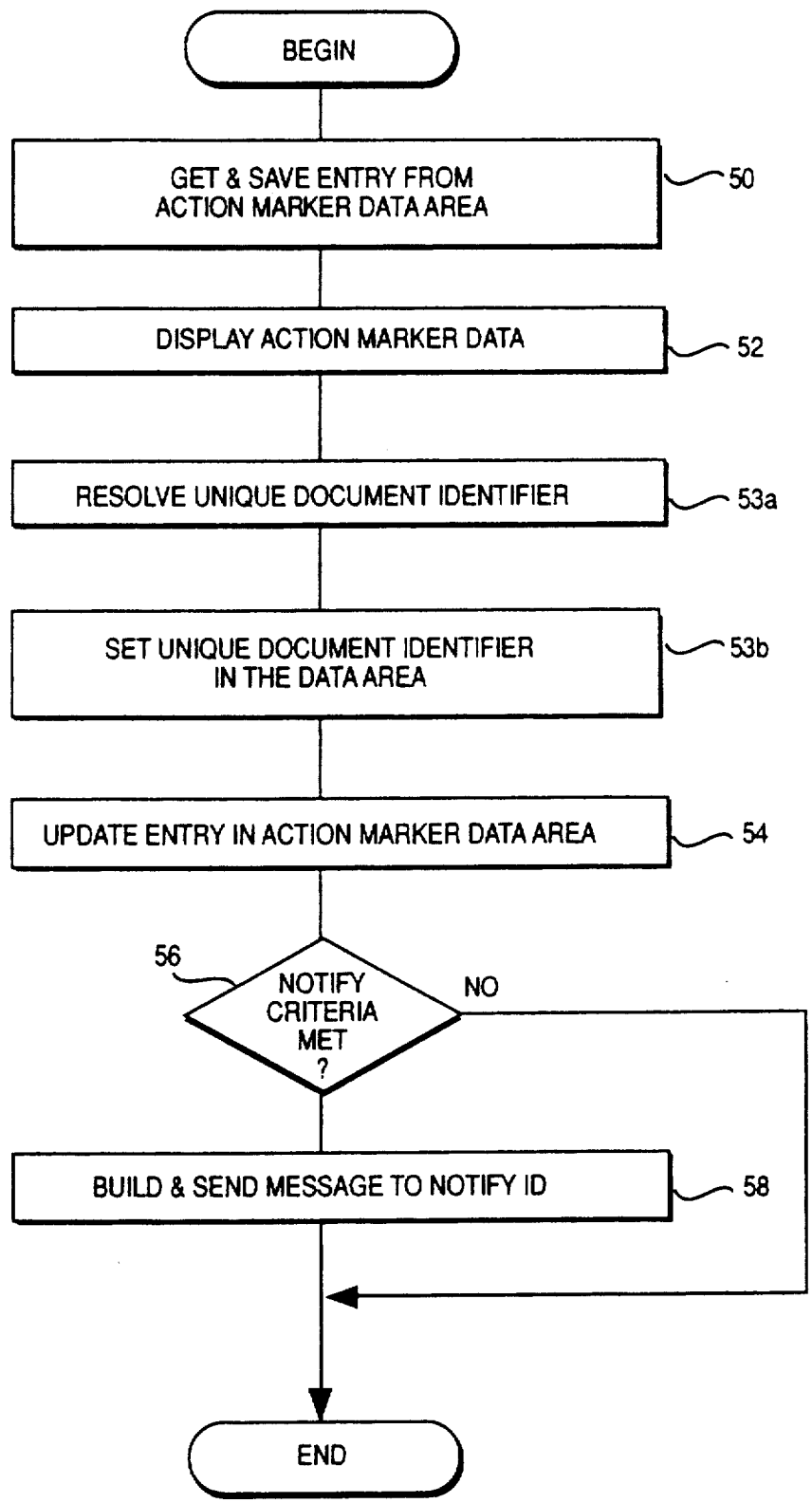

Referring to FIG. 8, there is shown a flow diagram of the update action application program. As noted above, each action to be specified in the document, as marked, is associated with an unique identifier. The identifier is used to couple an action marker entry in an action marker table (not shown) stored in the document management system 10 and the begin and end action markers. Either the begin action marker or the end action marker can be used to access the entry for this action. In step 50, the document management system 10 determines which action marker has been selected by determining the current position of the cursor. The action marker data area associated with the selected action marker is then retrieved from storage and displayed to the requesting EU in step 52. For each related document, a unique identifier is set in the action marker data area based upon a user assigned name. In step 54, the requesting EU enters data to update that which is currently displayed in the action marker data area. Step 56 determines whether the notification criteria has been met. In essence, the determination is whether (1) the status has been changed and if the new status equals the notification status and (2) whether the requesting EU wanted notification. If the requesting EU notification and the new status equals the notification status, a message is generated and transmitted to the requesting EU in step 58.

In summary, a requesting EU marks a section of a document to be reviewed by a responding EU. An action to be performed by the responding EU, an identification associated with the responding EU, a due date and a related document, which are specified by the requesting EU, become a part of the document and are associated with a begin action marker and an end action marker. The requesting EU may also specify notification criteria, notify ID and a status to be associated with the action to be performed. Multiple sections can be marked for review by the same responding EU or other responding EUs. After the document has been marked, the document is filed and the responding EU or EUs may be given access to the document to complete the review thereof. Alternately, after the filing of the document, the document can be transmitted to the responding EU or EUs for review thereby. Upon completion of the review of the document, the responding EU or EUs updates the status associated with the action and a message is automatically generated and transmitted to a end user associated with the notify ID if the updated status meets the notification criteria. Moreover, the responding EU or EUs may also specify related document which is associated with their respective review of the marked document.

What is claimed is:

1. In an information processing system, a method for a requesting user individual to mark for action by an end user individual data representing a specific document stored within the system, said method includes the steps of:
    accessing document data objects by said requesting user individual;
    assigning an identifier which defines the end user individual in response to a defining input by said requesting user individual;
    inserting into said document data objects a plurality of action markers which relate the action to be performed by said end user individual as defined by requesting user individual and said document data objects;
    linking into the document object data associated with said plurality of action markers to relate, the action to be performed by said end user individual as specified by said action markers, the end user individual to perform said action on said document objects as identified by said identifier, and the status associated with said plurality of action markers; and
    accessing of said document data objects by said end user individual as defined by said identifier.

2. The method as recited in claim 1 further includes the step of distinguishably identifying by object data representing a portion of said document to be marked with said action markers.

3. The method as recited in claim 2 wherein said inserting step includes the steps of:
    indicating to said system where a begin action marker is to be inserted; and
    indicating to said system where an end action marker is to be inserted.

4. The method as recited in claim 1 further includes the steps of the end user individual updating data objects associated with 1 or more of said plurality of action markers.

5. The method as recited in claim 4 wherein said updating step includes the steps of:
    selecting one of said plurality of action markers in said document data objects;
    activating a show action function for said selected one of said plurality of action markers;
    displaying said data area associated with said selected one of said action markers; and
    changing an entry associated with said status of said selected one of said plurality of action markers.

6. The method as recited in claim 5 wherein said document is a first reference document object and further includes the step of entering a pointer to a second reference document object which is associated with the changed entry and includes additional information relating to a review of said document as marked.

7. The method as recited in claim 6 wherein said linking into object data step includes the provision of a modified ID and further includes the steps of:
    specifying by the requesting user individual data in an action marker object to establish notification criteria;
    determining whether said changed entry associated with said status equals notification criteria specified by the requesting user individual;
    generating a response setting forth said status associated with said selected one of said plurality of action markers if said changed entry associated with said status equals said notification criteria; and
    transmitting said generated response to an end user identified by said notify ID.

8. The method as recited in claim 7 wherein said linking into data step includes the provision of a notify ID and further includes the steps of:
    determining whether said changed entry associated with said status equals said notification criteria;
    generating a response setting forth said status associated with said selected one of said plurality of action markers if said changed entry associated with said status equals said notification criteria; and
    transmitting said generated response and said second reference document object to an end user identified by said notify ID.

* * * * *